T. O. HELGERSON.
GRAIN SEPARATOR.
APPLICATION FILED SEPT. 20, 1917.
1,299,341.
Patented Apr. 1, 1919.
2 SHEETS—SHEET 2.
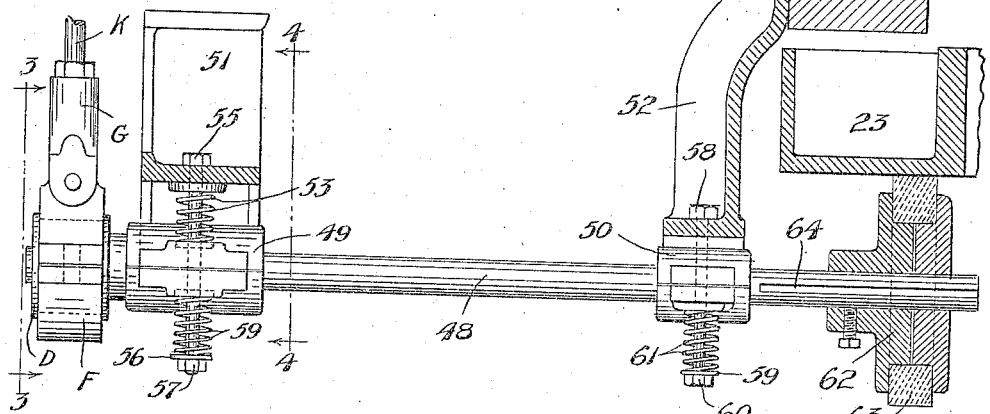
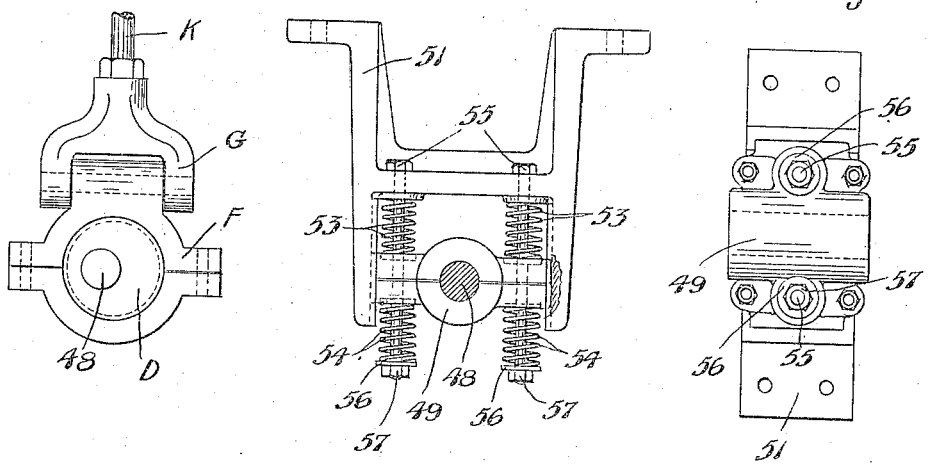
Witnesses
A. H. Opsahl
H. L. Opsahl
Inventor.
Thomas O. Helgerson
By his Attorneys
Williamson & Merchant

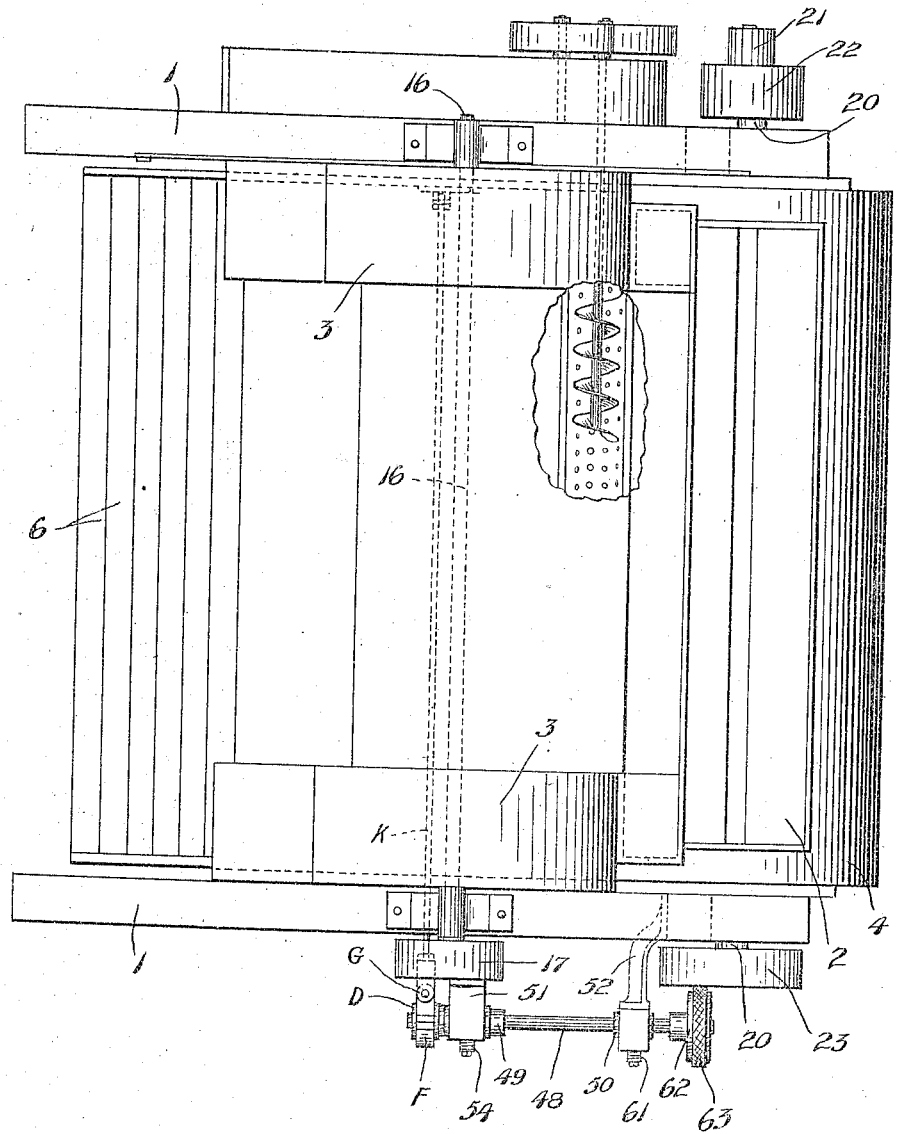

UNITED STATES PATENT OFFICE.

THOMAS O. HELGERSON, OF MINNEAPOLIS, MINNESOTA.

GRAIN-SEPARATOR.

1,299,341.	Specification of Letters Patent.	Patented Apr. 1, 1919.

Original application filed March 17, 1915, Serial No. 14,911. Divided and this application filed September 20, 1917. Serial No. 192,390.

*To all whom it may concern:*

Be it known that I, THOMAS O. HELGERSON, a citizen of the United States, residing at Minneapolis, in the county of Hennepin and State of Minnesota, have invented certain new and useful Improvements in Grain-Separators; and I do hereby declare the following to be a full, clear, and exact description of the invention, such as will enable others skilled in the art to which it appertains to make and use the same.

My invention has for its object to provide an improved means for converting rotary motion into vibratory motion; and to such ends, generally stated, the invention consists in the novel devices and combinations of devices hereinafter described and defined in the claims.

This improved motion transmitting and converting mechanism is capable of many uses, but is particularly designed and especially adapted for use in connection with fanning mills and separators wherein sieve-equipped shoes are given vibratory motion from a running shaft.

The present application is filed as a division of my co-pending application S. N. 14,911, filed of date, March 17, 1915, and entitled "Grain separator".

In the accompanying drawings which illustrate the invention, like characters indicate like parts throughout the several views.

Referring to the drawings,

Figure 1 is a plan view illustrating my invention as applied to or incorporated in a grain separator;

Fig. 2 is an enlarged horizontal section taken centrally through the transmission mechanism shown in Fig. 1, some parts being broken away;

Fig. 3 is a detail in side elevation showing parts in the vicinity of the line 3—3 on Fig. 2;

Fig. 4 is a section taken on the line 4—4 of Fig. 2; and

Fig. 5 is a front elevation of the parts shown in Fig. 4.

Of the parts of the grain separator illustrated, it is desirable for the purposes of this case to particularly note only the framework 1, the feed hopper 2, suction fan casing 3 and blower fan casing 4, and the vibratory sieve-equipped shoe 6, which latter is supported by suitable means, not shown, for vibratory movements transversely of the machine. Working within the fan casing 3 is a fan not illustrated in detail, but the shaft 16 of which projects at its ends, is journaled in suitable bearings on the frame bar, and, at one end, is provided with a pulley 17 over which a belt, not shown, will be run to impart rotary motion to the said shaft.

Working within the fan casing 4 is the customary blower fan, not illustrated in detail, but the shaft 20 of which is journaled in suitable bearings in the frame bar and projects at both ends, being provided at one end with driving pulley 21—22, and at its other end with a face friction wheel or disk 23.

In the present application of my invention, vibratory motion is imparted to the sieve-equipped shoe 6 by means of my novel transmission mechanism, the preferred form of which is here illustrated. This driving mechanism, includes a counter shaft 48 that is journaled in yieldingly supported bearings 49—50. The bearing 49 is guided for sliding movements between the prongs of a supporting bracket 51 rigidly secured to one side of the frame 1; and, likewise, the bearing bracket 50 is mounted for sliding movements between the prongs of a bracket 52, also rigidly secured to said framework. The bearing 49 is yieldingly cushioned in both movements, by inside coiled springs 53 and outside coiled springs 54. Thrust bolts 55 are extended through flanges of the bracket 51, through perforations in the projecting upper and lower flanges of the bearing 49 and through the upper and lower coiled springs 53—54; and at their outer ends, said bolts are shown as provided with washers 56 and nuts 57. By adjustments of the nuts 57, the tension of the springs may be varied and the crank end of the shaft may be adjusted horizontally. Thrust bolts 58 are passed through a flange on the bracket 52 and through flanges on the bearing 50, and, as shown, are provided at their outer ends with washers 59 and nuts 60. Cushioning springs 61 placed around the bolt 58 are compressed between washers 59, to flanges of the bearing 50.

At its right hand end, as shown in Figs. 1 and 2, the shaft 48 is provided with a peripheral friction wheel 62 that coöperates with the face friction wheel 23 already noted. This friction wheel 62 is of any well known type, but preferably is provided with a fiber friction band 63 that is pressed into frictional contact with the face of the said wheel 23, by the tension of the springs 61. Also, this friction wheel is made axially adjustable on the shaft 48, so as to set the same for variable speed transmission which, as shown, is accomplished by providing the shaft with a long keyway 64 that is engaged by a key in the hub of the wheel 62. As shown, the hub of the said wheel 62 is further provided with a set screw 65, by means of which it may be locked to the shaft 48 in different adjustments in respect to the axis of the friction wheel 23. Obviously, the further the friction wheel 62 is set from the axis of the wheel 23, the greater will be the speed of the shaft 48 in respect to the speed of rotation of the wheel 23.

At its left hand end, as shown in Figs. 1 and 2, the shaft 48 carries an eccentric or crank $d$ on which is mounted an eccentric strap $f$ that has a heavy projecting lug to which a head $g$ of a long pitman $k$ extends through clearance passages in the side of the sieve shoe 6 and is pivotally connected to the said shoe, preferably, at the far side thereof, (see Fig. 1).

All of the parts herein specifically described are designated by the same numerals as in my co-pending application above identified.

Various vibratory bodies such, for example, as sieve shoes, require vibration at a comparatively high rate of speed and when thus vibrated, as is well known, a very considerable momentum and inertia that must be overcome at the limit of reciprocation. By yieldingly mounting the eccentric or crank shaft 48, substantially as illustrated in the drawings, shocks which otherwise would be produced, are absorbed in the springs which support the bearings in which the said shaft is mounted. The pivotal connection between the head $g$ and eccentric strap $f$ permits the free unrestricted action of the eccentric and pitman, regardless of changes of the angle of the crank shaft 48, in respect to the plane of operation of the said pitman. This is highly important because the said shaft will change its angle to the original position when its fiber facing 43 wears away, and its diameter is thereby decreased, and also, the said shaft will continuously change its angle, to some extent, when the springs 48 yield to overcome the momentum of the shoe. Moreover, with the above construction, it is not important that the pitman or crank rod be set in a plane that is exactly at an angle to the axis of the shaft. The eccentric strap and pitman head described constitute what may be termed a universal knuckle joint connection between the pitman and the eccentric or crank.

The friction drive is also highly important for several reasons, notably, because slightly angular movements of the shaft 48, in respect to the friction face of the wheel 23, does not interfere with the frictional contact between the two friction wheels 23 and 62. Also, this type of friction drive will permit adjustments for variable speed and will operate equally well in all positions of the wheel 62, regardless of the vibratory movements of the shaft 48.

What I claim is:

1. The combination with a vibratory body, of a driving shaft, a driven shaft, coöperating face and peripheral friction wheels connecting said driven shaft to said driven shaft, the said driven shaft being yieldingly mounted for angular movements and provided with an eccentric, and a pitman connection between said eccentric and said vibratory body.

2. The combination with a vibratory body, of a driving shaft, a driven shaft, coöperating face and peripheral friction wheels connecting said driving shaft to said driven shaft, the said driven shaft being yieldingly mounted for angular movements and provided with an eccentric, and a pitman connected at one end to said vibratory body and at its other end having a head pivoted thereto for lateral swinging movements and journaled on said eccentric.

3. The combination with a vibratory body, of a face friction wheel, a shaft having a peripheral friction wheel coöperating with said face friction wheel, an eccentric on said shaft, a pitman connection between said eccentric and vibratory body, and a spring supported bearing for said shaft arranged to cushion the shocks produced in said shaft by the reversal of the movement of said body.

In testimony whereof I affix my signature in presence of two witnesses.

THOMAS O. HELGERSON.

Witnesses:
HARRY D. KILGORE,
BERNICE G. BAUMANN.

Copies of this patent may be obtained for five cents each, by addressing the "Commissioner of Patents, Washington, D. C."